United States Patent
Miklós et al.

(10) Patent No.: US 12,279,148 B2
(45) Date of Patent: *Apr. 15, 2025

(54) AGGREGATION OF CONGESTION CONTROL

(71) Applicant: Telefonaktiebolaget LM Ericsson (publ), Stockholm (SE)

(72) Inventors: György Miklós, Pilisborosjenö (HU); Maria Belen Pancorbo Marcos, Madrid (ES)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 404 days.

This patent is subject to a terminal disclaimer.

(21) Appl. No.: 16/946,809

(22) Filed: Jul. 7, 2020

(65) Prior Publication Data

US 2020/0336933 A1 Oct. 22, 2020

Related U.S. Application Data

(63) Continuation of application No. 14/750,078, filed on Jun. 25, 2015, now Pat. No. 10,728,793.

(Continued)

(51) Int. Cl.
*H04W 28/02* (2009.01)
*H04L 43/08* (2022.01)
(Continued)

(52) U.S. Cl.
CPC ......... *H04W 28/0247* (2013.01); *H04L 43/08* (2013.01); *H04L 47/11* (2013.01);
(Continued)

(58) Field of Classification Search
CPC ........ H04W 28/00; H04L 43/00; H04L 47/00; H04L 65/00
See application file for complete search history.

(56) References Cited

U.S. PATENT DOCUMENTS 8,687,582 B2 4/2014 Qin et al.
10,728,793 B2 * 7/2020 Miklós .................... H04L 47/11
(Continued)

FOREIGN PATENT DOCUMENTS

EP 2056570 A1 5/2009
EP 2190151 A1 5/2010
(Continued)

OTHER PUBLICATIONS

China Telecom et. al. "RPPF based Solution for Operator Controlled Off-Path Congestion Awareness and Notification" (Title), SA WG2 Meeting #S2-97, S2-131610, May 27-31, 2013, Busan, South Korea. (Year: 2013).*

(Continued)

*Primary Examiner* — Jamaal Henson
(74) *Attorney, Agent, or Firm* — COATS & BENNETT, PLLC

(57) ABSTRACT

Systems and methods related to congestion monitoring in a mobile communications network; in particular, a congestion monitoring unit that sends congestion information to a policy control unit for a plurality of mobile entities, wherein each of the mobile entities is connected to a respective radio access network and associated with the policy control unit, the congestion information indicates congestion of the respective radio access network. The congestion monitoring unit sends a request message to a policy control unit for transmitting congestion information of a mobile entity, the message routed by a Diameter Routing Agent (DRA) and includes congestion information and an identity for a given mobile entity; in response, the policy control unit sends a response message including an identity of the policy control unit. The congestion monitoring unit can then send aggregated congestion information for a plurality of mobile entities associated with the policy control unit.

18 Claims, 8 Drawing Sheets

Related U.S. Application Data

(60) Provisional application No. 62/018,731, filed on Jun. 30, 2014.

(51) Int. Cl.
*H04L 47/11* (2022.01)
*H04L 47/41* (2022.01)
*H04L 65/80* (2022.01)

(52) U.S. Cl.
CPC .............. *H04L 47/41* (2013.01); *H04L 65/80* (2013.01); *H04W 28/0205* (2013.01)

(56) References Cited

U.S. PATENT DOCUMENTS

| | | | |
|---|---|---|---|
| 2006/0104298 | A1 | 5/2006 | Mcalpine et al. |
| 2007/0078956 | A1* | 4/2007 | VanGompel ............ G06F 16/21 710/62 |
| 2008/0080553 | A1* | 4/2008 | Hasty ................... H04L 1/0002 370/468 |
| 2009/0305684 | A1* | 12/2009 | Jones ..................... H04L 63/20 455/418 |
| 2010/0311392 | A1* | 12/2010 | Stenfelt ................. H04W 12/06 455/411 |
| 2011/0165901 | A1 | 7/2011 | Baniel et al. |
| 2012/0201137 | A1 | 8/2012 | Le Faucheur et al. |
| 2013/0115919 | A1* | 5/2013 | Xu ........................ H04W 76/10 455/411 |
| 2013/0279406 | A1* | 10/2013 | Merino Vazquez ........................ H04L 65/1016 370/328 |
| 2014/0029420 | A1* | 1/2014 | Jeong ..................... H04W 8/18 370/328 |
| 2014/0242916 | A1* | 8/2014 | Bellamkonda .......... H04L 47/11 455/67.11 |
| 2014/0379835 | A1 | 12/2014 | Foerster et al. |
| 2015/0103664 | A1 | 4/2015 | Shan et al. |
| 2015/0236891 | A1* | 8/2015 | Rasanen ............. H04L 41/0893 709/223 |
| 2015/0365843 | A1* | 12/2015 | Miklós .................... H04W 8/14 370/235 |
| 2015/0382230 | A1 | 12/2015 | Miklos et al. |
| 2016/0029247 | A1* | 1/2016 | Shan ....................... H04L 47/12 370/235 |
| 2016/0073282 | A1 | 3/2016 | Speicher et al. |
| 2016/0337898 | A1* | 11/2016 | Jeong ................. H04W 12/041 |
| 2018/0020370 | A1* | 1/2018 | Zhou ..................... H04M 15/66 |
| 2024/0015584 | A1* | 1/2024 | Jeong ................. H04W 12/041 |

FOREIGN PATENT DOCUMENTS

| | | |
|---|---|---|
| EP | 2819455 A1 | 12/2014 |
| RU | 2501193 C1 | 12/2013 |
| WO | 2011063853 A1 | 6/2011 |
| WO | 2014185987 A1 | 11/2014 |

OTHER PUBLICATIONS

China Telecom et al RPPF based solution for operator controlled offpath congestion awareness and notification vol. SA WG2 Meeting S297 no Busan South Korea 2731 May 2013 May 21, 2013 May 21, 2013 pp. 1-10 XP050708820 Retrieved from the Internet URLhttpwww3gpporgftptsg_saWG2_ArchTSGS2_97_BusanDocs retrieved on May 21, 2013 information to CN figures 1-6.X.2-4.
3GPP TR 23.705, V0.11.0 Technical Report, 3rd Generation Partnership Project; Technical Specification Group Services and System Aspects; Study on system enhancements for user plane congestion management (Release 13), 3GPP A Global Initiative, dated May 2014, 64 pages.
Russian Decision to Grant a Patent for Invention Application No. 2017102714, dated May 23, 2018, 9 pages.
3GPP TS 23.203, V13.0.0 Technical Report, 3rd Generation Partnership Project; Technical Specification Group Services and System Aspects; Policy and charging control architecture (Release 13), 3GPP, dated Jun. 2014, 220 pages.
Calhoun, P., et al., "Diameter Base Protocol", Network Working Group, Ericsson, RFC 3588, Sep. 2003, 147 pages.
PCT/EP2015/058754 International Search Report dated Sep. 24, 2015, 7 pages.

* cited by examiner

AGGREGATION OF CONGESTION CONTROL

CROSS-REFERENCE TO RELATED APPLICATIONS

This application is a continuation of U.S. patent application Ser. No. 14/750,078, filed on Jun. 25, 2015, and issued as U.S. Pat. No. 10,728,793 on Jul. 25, 2020, which claims the benefit of International Application No. PCT/EP2015/058754, filed Apr. 23, 2015, which claims the benefit of U.S. Provisional Application No. 62/018,731, filed on Jun. 30, 2014, the disclosures of which are fully incorporated herein by reference.

TECHNICAL FIELD

The application relates to techniques of sending aggregated congestion information from a congestion monitoring unit to a policy control unit of a mobile communications network.

BACKGROUND

Packet data traffic is growing very quickly in mobile communications networks or mobile operator networks; in many cases, it grows faster than a rate at which operators can expand network capacity. This leads to more frequent occurrences of congestion of a radio access network (RAN). Congestion may occur when data traffic exceeds a data traffic capacity of RAN. Also, new services appear which may lead to a situation when a new Quality of Experience requirement has to be introduced into the network. In this situation, operators need efficient and flexible tools by which they can control sharing of the bottleneck of RAN capacity to increase the Quality of Experience.

Recently, in the context of the $3^{rd}$ Generation Partnership Project (3GPP) User plane congestion management (UPCON) work item, a new solution has been put forward which utilizes congestion feedback from the RAN to the CN (Core Network), see 3GPP Technical Report (TR) 23.705, version 0.10.0 of May 2014, section 6.1. When the RAN indicates congestion to the CN, the CN can take actions to mitigate the congestion, such as limiting some classes of traffic or request to delay some other classes of traffic.

The RAN Operation and Maintenance (OAM) systems typically provide information based on which an operator may derive when congestion takes place. Such information can include, e.g., an amount of packet loss, packet delay, traffic throughput, air interface utilization, a number of connected users, a number of connected users with non-empty buffers, etc. An operator may configure thresholds on one of these metrics or on a combination of these metrics to determine when a state of congestion is considered, i.e., when congestion becomes significant. It is also possible for a operator to define multiple levels of congestion using a combination of these metrics so that the actions for congestion mitigation can be based on the level of congestion.

Current RAN OAM systems operate on a per-cell level or even on lower spatial granularity. I.e., determining congestion may be performed on a per-cell basis or may be performed for a group of cells, such as cells belonging to the same eNodeB (evolved Node B) for mobile communications networks according to the Long Term Evolution (LTE) standard as specified by the 3GPP, or cells belonging to the same Service Area for mobile communications networks according to the Universal Mobile Telecommunications System (UMTS) standard as specified by the 3GPP. In order for the CN to take an appropriate mitigation action, the CN typically needs to determine which mobile entities (UEs) are located in a given cell. Hence, the list of affected UEs needs to be determined for the cells which are considered congested based on OAM data.

One solution for OAM based congestion reporting is documented in solution 1.5.5 (also called off-path solution) in section 6.1.5.5 of 3GPP TR 23.705, version 0.10.0 of May 2014 which suggests the interface Nq for this purpose. The Nq interface is defined between a network entity labeled RAN Congestion Awareness Function (RCAF) and the Mobility Management Entity (MME). The RCAF receives a congestion report including RAN congestion related data from the RAN OAM system on a per cell spatial granularity or at a lower granularity. Then, using the Nq interface, the RCAF queries the MME to supply the list of UEs per cell.

A similar approach is suggested for the UMTS case, using Nq' interface from the RCAF to the Serving GPRS Support Node (SGSN). However, there is a difference for UMTS since the RAN can already be aware of the identities of UEs as, e.g., the International Mobile Subscriber Identity (IMSI) can be sent to the Radio Network Controller (RNC). The RAN OAM collects these IMSIs and the RAN OAM then supplies the list of UEs identified by IMSI that are affected by congestion to the RCAF. Hence, in such a UMTS scenario, the list of UEs affected by congestion are known to the RCAF without contacting the SGSN over the Nq' interface.

Once the RCAF node has collected information about the set of UEs affected by congestion, it notifies the Policy and Charging Rules Function (PCRF) about the congestion level of the affected UEs by sending congestion information. Here, the UEs may be identified by a UE identifier such as the IMSI. The Np interface is defined between the RCAF and the PCRF for this purpose. As described in 3GPP TR 23.705, version 0.10.0 of May 2014, section 6.1.6, the PCRF can then take actions to mitigate the congestion e.g., by limiting the traffic in an enforcement node such as a Packet Data Network Gateway (PGW) or Traffic Detection Function (TDF), or notifying the Application Function (AF) to limit or delay the traffic, etc.

Current techniques typically require a comparably large number of messages including congestion information to be sent from the RCAF to the PCRF via the Np interface. This may itself cause significant traffic on the Np interface. In case a given cell becomes congested, usually a larger number of UEs connected to this cell becomes affected by congestion; in turn, a congestion status for this number of UEs typically changes together. Therefore, excessive signaling traffic on the Np interface may result, requiring expensive and complex upgrades of the PCRF and/or the RCAF to handle such situations. Excessive signaling on the Np interface can render operation of the mobile communications network unstable, especially when a significant part of the mobile communications network suffers from congestion.

SUMMARY

Therefore, there is a need for advanced techniques of signaling of congestion information. In particular, there is a need for such techniques of signaling of congestion information which impose comparably small amounts of traffic on the respective interface.

According to an aspect, a method of sending congestion information for a plurality of mobile entities to a policy control unit is provided. Each one of the plurality of mobile entities is connected to a respective radio access network of the mobile communications network. Each one of the plurality of mobile entities is associated with the policy control unit. The congestion information indicates congestion of the respective radio access network. The method comprises a congestion monitoring unit aggregating the congestion information for at least some of the plurality of mobile entities based on the respective mobile entities being associated with the policy control unit. The method further comprises the congestion monitoring unit sending a message including the aggregated congestion information to the policy control unit.

According to a further aspect, a congestion monitoring unit is provided. The congestion monitoring unit is configured to send congestion information from a plurality of mobile entities to a policy control unit. Each one of the plurality of mobile entities is connected to a respective radio access network of the mobile communications network. Each one of the plurality of mobile entities is associated with a policy control unit. The congestion information indicates congestion of the respective radio access network. The congestion monitoring unit comprises a processor configured to aggregate the congestion information for at least some of the plurality of mobile entities based on the respective mobile entities being associated with the policy control unit. The congestion monitoring unit further comprises an interface configured to send a message including the aggregated congestion information to the policy control unit.

According to a further aspect, a method of receiving congestion information for a plurality of mobile entities from a congestion monitoring unit of a mobile communications network is provided. Each one of the plurality of mobile entities is connected to a respective radio access network on the mobile communications network. Each one of the plurality of mobile entities is associated with a policy control unit. The congestion information indicates congestion of the respective radio access network. The method comprises the policy control unit receiving a message from the congestion monitoring unit. The message includes aggregated congestion information for a plurality of mobile entities associated with the policy control unit.

According to a further aspect, a policy control unit is provided. The policy control unit is configured to receive congestion information for a plurality of mobile entities from a congestion monitoring unit. Each one of the plurality of mobile entities is connected to a respective radio access network on the mobile communications network. The congestion information indicates congestion of the respective radio access network. The policy control unit comprises an interface. The interface is configured to receive a message from the congestion monitoring unit. The message includes aggregated congestion information for a plurality of mobile entities associated with the policy control unit.

According to a further aspect, a method of sending an identity of a policy control unit of a mobile communications network to a congestion monitoring unit is provided. The congestion monitoring unit monitors congestion of a respective radio access network to which mobile entities are connected. The method comprises a routing database entity receiving a request message from a congestion monitoring unit. The request message includes an identity of a mobile entity connected to a radio access network of the mobile communications network. The method further comprises retrieving an identity of the policy control unit which is associated with the mobile entity from a database. The retrieving is based on the identity of the mobile entity. The method further comprises the routing database entity sending a response message to the congestion monitoring unit based on the identity of the policy control unit. The message includes the identity of the policy control unit.

According to a further aspect, a routing database entity is provided. The routing database entity is configured to send an identity of a policy control unit of a mobile communications network to a congestion monitoring unit. The congestion monitoring unit monitors congestion of a respective radio access network to which mobile entities are connected. The routing database entity comprises an interface configured to receive a request message from a congestion monitoring unit. The request message includes an identity of a mobile entity connected to a radio access network of the mobile communications network. The routing database entity further comprises a processor. The processor is configured to retrieve an identity of the policy control unit associated with the mobile entity from a database. The retrieving is based on the identity of the mobile entity. The interface is further configured to send a response message to the congestion monitoring unit. The response message includes the identity of the policy control unit.

Details of such embodiments and further embodiments will be apparent from the following detailed description of embodiments.

DETAILED DESCRIPTION

In the following, concepts according to embodiments will be explained in greater detail by referring to the accompanying drawings. The illustrated concepts relate to techniques of sending aggregated congestion information. Specifically, the concepts relate to sending a message from a congestion monitoring unit of a mobile communications network to a policy control unit of a mobile communications network, the message including the aggregated congestion information. The mobile communications network may, e.g., be based on the LTE technology specified by 3GPP and a OAM-based congestion reporting as described in 3GPP TR 23.705 of May 2014, section 6.1.5.5. However, it is to be understood that the mobile communications network could implement other technologies as well, e.g., UMTS or Global System for Mobile Communication (GSM) in connection with General Packet Radio Service (GPRS).

In the concepts as illustrated in the following, a congestion monitoring unit sends aggregated congestion information to a policy control unit of the mobile communications network. The aggregated congestion information may indicate a level of congestion for a plurality of UEs that are associated with the policy control unit. E.g., the level of congestion may be indicated on a per-UE basis or may be indicated for a group of UEs. The policy control unit controls implementation of policies to data traffic to and from the UEs associated therewith. It is possible that the policy enforcement of the policy control unit is based on the received congestion information.

By such techniques, it becomes possible to reduce an amount of signaling traffic on a respective interface between the congestion monitoring unit and the policy control unit, i.e., in the case of the LTE technology the Np interface between a RCAF and a PCRF. In particular, since it is possible to include congestion information for a plurality of UEs in a single message (aggregation), it is possible to reduce the signaling traffic approximately by the ratio of aggregation, i.e., a number of pieces of congestion information per message. Further, overhead required for signalling of the congestion information may be reduced by re-using a data header of the message for a plurality of pieces of congestion information when aggregating.

Figure 1:
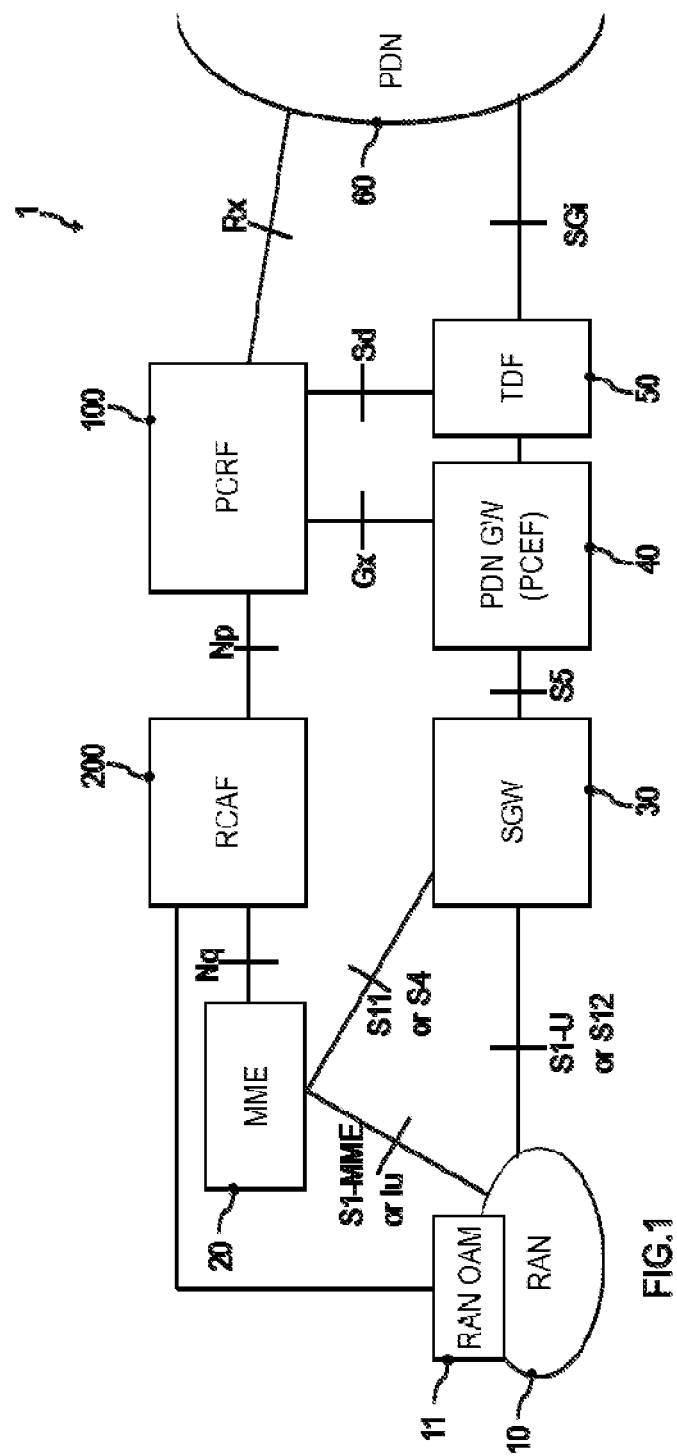
FIG. 1 shows an embodiment of a system architecture incorporating features of the invention including a RCAF and a PCRF which interact to signal congestion information.

FIG. 1 shows an architecture of a mobile communications network 1 according to the LTE technology in which a congestion monitoring unit in the form of RCAF 200 determines congestion levels of UEs (not shown in FIG. 1) in a RAN 10. The RCAF 200 is able to determine a RAN user plane congestion which occurs when the demand for RAN resources exceeds the available RAN capacity to deliver user data for a period of time. RAN user plane congestion may lead, inter alia, to packet drops or delays. The RCAF 200 typically retrieves a congestion report on the ongoing RAN user plane performance status at cell level from the RAN OAM unit 11; this congestion report is typically analyzed and evaluated prior to reporting it on as congestion information to a policy control unit implemented in the scenario of FIG. 1 as PCRF 100. For the communication of the congestion information between the RCAF 200 and the PCRF 100, the Np interface is provided.

It is possible to implement and facilitate communication between RCAF 200 and PCRF 100 via a routing database entity (not shown in FIG. 1) such as a Diameter Routing Agent (DRA). Such techniques enable to send a message, e.g., from the RCAF 200 to the PCRF 100, via the DRA by employing a logical name of the PCRF 100 rather than an Internet Protocol (IP) address and/or a Domain Name System (DNS) name of the PCRF 100. However, it is possible that the RCAF 200 retrieves an identity of the PCRF 100, wherein the identity of the PCRF 100 is at least one of the IP address of the DNS name. Alternatively or additionally, it is then possible to send a message including aggregated congestion information from the RCAF 200 to the PCRF 100 by directly routing the message to the PCRF 100, i.e., making it unnecessary to employ the DRA.

The RCAF 200 is furthermore connected via an Nq interface to MME. In the case of the UMTS technology (not shown in FIG. 1), the RCAF 200 is connected via the Nq' interface to the SGSN 20. User plane data for which congestion is monitored is transmitted from RAN 10 via a serving gateway (SGW) 30 which routes and forwards user data packets to a Packet Data Network gateway (PDN GW or PGW) 40. From the PDN GW 40, the user data is transmitted via a TDF 50 to the Packet Data Network (PDN) 60. This corresponds to the uplink direction. It is also possible that user data is transmitted in the downlink direction, i.e., towards the RAN 10.

The following description focuses on RCAF 200 and PCRF 100 and interaction between RCAF 200 and PCRF 100. The RCAF 200 uses a congestion report provided by the RAN OAM 11 including such information as the amount of data packet loss, packet delay, traffic throughput, air interface utilization or number of connected users to determine, e.g., based on configurable thresholds, a congestion state of a certain area. The RCAF 200 determines which UEs are affected by a congestion state in a certain area using information provided by the MME 20.

In FIG. 1, a single PCRF 100 is shown. However, there may be a plurality of PCRFs 100 in the mobile communications network 1. A given RCAF 200 may be able to communicate selectively with a given one of a plurality of PCRFs 100. Typically, a given UE is statically associated with/assigned to a particular PCRF 100 acting as a mobility anchor for the given UE. The PCRF 100 handles an IP Connectivity Access Network (IP CAN) session of the given UE. The PCRF 100 implements policy of data traffic handling for the associated UEs by controlling the TDF 50 and/or the PDN GW 40 implementing a Policy Control Enforcement Function (PCEF) via the Sd and Gx interfaces, respectively.

In general, it is possible that a given UE is associated with a single PCRF. It is also possible, that a given UE is associated with a plurality of PCRFs 100. E.g., the given UE may have multiple PDN connections to different PDNs 60 (not shown in FIG. 1). The PDNs may be identified by their Access Point Names (APNs). For each APN, in general it is possible that there is a different PCRF 100. E.g., a UE can be simultaneously connected to a first PDN and to a second PDN, wherein the first PDN 60 is identified by a first APN and wherein the second PDN 60 is identified by a second APN. For data traffic between the UE and the first PDN 60, the UE may be associated with a first PCRF 100. For data traffic between the UE and the second PDN 60, the UE may be associated with a second PCRF 100.

The RCAF 200 is configured to aggregate the congestion information for at least some of a plurality of UEs based on the respective UEs being associated with the PCRF 100. I.e., congestion information relating to a congestion level of a given UE associated with a given PCRF 100 (with a different PCRF than the given PCRF 100), is included (is excluded) from aggregation into a given message. The RCAF 200 then sends the message including the aggregated congestion information to the PCRF 100. The PCRF 100 is configured to receive the message from the RCAF 200, the message including the aggregated congestion information for a plurality of UEs associated with the PCRF 100. The PCRF 100 may reply with a result message. In the result message, it is possible to give a single success or error code for an entire message including the aggregated congestion information. Alternatively or additionally, success or error codes could be given individually for each congestion information included in the message. It is possible that the message and/or the result message are encoded according to the Diameter protocol, see Request For Changes (RFC) 6733 of the Internet Engineering Task Force (IETF).

By sending the message including the aggregated congestion information, data traffic on the Np interface can be reduced. In particular, it is not necessary to send a single message for each congestion information for every UE. By collecting congestion information for a plurality of UEs which are all assigned to one and the same PCRF 100, it becomes possible to reduce a ratio of overhead per signaling, thereby further reducing the traffic imposed on the Np interface and reduce the processing requirements on the PCRF and RCAF nodes.

In order to effectively implement aggregation of congestion information, typically both the RCAF 200 and the PCRF 100, need to support the respective aggregation schemes. It may be possible that the architecture of the mobile communications network 1 includes aggregation of congestion information as an optional feature. In a simple scenario, the PCRF 100 and/or the RCAF 200 may rely on a predefined local configuration of capabilities of the respective other unit to determine whether congestion information aggregation is supported or not; sending of the message including the aggregated congestion information may then be selectively executed depending on this local configuration. However, it can be desirable to implement negotiation techniques between the RCAF 200 and the PCRF 100 in order to dynamically establish a handshake there between indicating capabilities of message aggregation. To facilitate the capability negotiation, the RCAF 200 may indicate, e.g., by a flag or otherwise, in a control message from the RCAF 200 to the PCRF 100 that aggregation of congestion information is supported. Alternatively or additionally, the PCRF 100 may indicate, e.g., by a flag or otherwise, in a control message from the PCRF 100 to the RCAF 200 whether or not congestion information aggregation is supported; it is possible to include the identity of the PCRF 100 in such a control message facilitating direct routing of further messages from the RCAF 200 to the PCRF 100. Generally, negotiation of congestion information aggregation may be triggered by the PCRF 100 and/or the RCAF 200. In such a manner, the PCRF 100 and the RCAF 200 can be notified whether the respective other node 100, 200 supports congestion information aggregation and, e.g., selectively apply congestion information aggregation only when both nodes signal support.

It is possible to negotiate further aggregation parameters—beyond the mere capability to support congestion information aggregation—between the PCRF 100 and the RCAF 200. E.g., it is possible that the RCAF 200 and the PCRAF 100 negotiate at least one of a latency or a maximum size of a message including the aggregated congestion information. E.g., it is possible that a maximum size of the message including the aggregated congestion information—respectively a maximum number of congestion information per message—is limited in the RCAF 200 and/or the PCRF 100, e.g., due to technical restrictions or traffic considerations. This may impose a limitation when the RCAF 200 aggregates the congestion information; aggregation should be aborted once the maximum size has been reached. In a simple scenario, it is possible that the maximum message size is statically pre-configured into the RCAF 200. It is, however, also possible that the PCRF 100 indicates the maximum message size explicitly or implicitly to the RCAF 200. This indication can be done as part of the negotiation, respectively handshake between the RCAF 200 and the PCRF 100. If, e.g., supported maximum message sizes differ between the PCRF 100 and the RCAF 200, the RCAF 200 should employ the strictest limitation.

In order to further reduce signaling traffic imposed on the Np interface, it is possible that the RCAF 200 employs compression schemes before sending the aggregated congestion information to the PCRF 100. This may reduce the size of the message including the aggregated congestion information; thereby, delivery of the message may be achieved faster and possible more reliably. The particular type of the message compression technique applied is not limited. E.g., message compression techniques may range from grouping of congestion information of UEs depending on a level of congestion indicated by the respective congestion information; via replacing particular common APN by a shorter token; to more complex compression schemes such as, e.g., run length encoding or entropy encoding.

It may be desirable to implement reliable delivery of messages including the aggregated congestion information. This may be achieved by employing a reliable or semi-reliable transport protocol to deliver the messages, e.g., the Transmission Control Protocol (TCP) or the Stream Control Transmission Protocol (SCTP). Alternatively or additionally, acknowledgement schemes may be employed. It may be possible to implement acknowledgement from the PCRF 100 to the RCAF 200 in order to decrease a likelihood of transmission failures. Acknowledgements from the PCRF 100 to the RCAF 200 can also be used to convey the result of message processing and indicating success or an error code, i.e., including the result message.

Figure 2A:
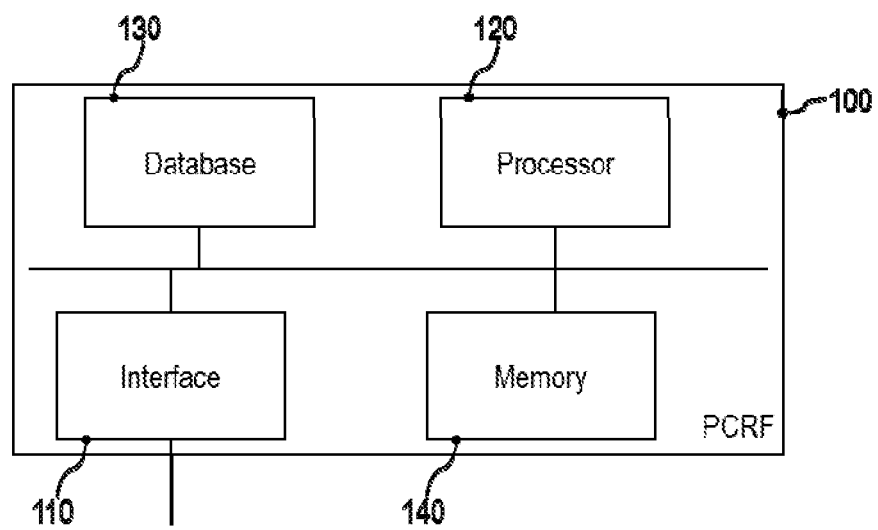
FIG. 2A schematically illustrates an embodiment of the PCRF in greater detail.

FIG. 2A is a schematic illustration of the PCRF 100. The PCRF 100 includes an interface 110, a database 130, and a processor 120. The interface 110 can be configured to communicate with various entities of the mobile communications network 1 by sending and/or receiving of data. E.g., the interface 110 can be configured to communicate with the RCAF 200 via the Np interface (see FIG. 1). The processor 120 of the PCRF 100 can be configured to execute various tasks in connection with de-aggregation of the received message including the aggregated congestion information for a plurality of UEs associated with the PCRF 100; and determining policies for particular UEs associated with the PCRF 100, e.g., depending on the respective congestion information. The database 130 may store various information related to the UEs associated with the PCRF 100. E.g., the database 130 may store congestion information previously received via the interface 110 for a given UE. In the database 130, also a mapping between various RCAFs 200 deployed throughout the mobile communications network 1 and associated UEs may be provisioned. Various policies for a given UE may be provisioned in the database 130. A memory 140 is further provided which may be a read-only memory, a flash read-only memory, a random access memory, a mass storage, a hard disk, or the like. The memory 140 includes suitable program codes to be executed by the processor 120 so as to implement the above-described functionalities. The processor 120 can then generate the commands that are needed to carry out the above discussed procedures in which the PCRF 100 is involved, in particular message de-aggregation and/or control of implementation of policies of data traffic to and/from a given UE associated with the PCRF and/or negotiation of aggregation capabilities and aggregation parameters for the aggregation of the congestion information.

Figure 2B:
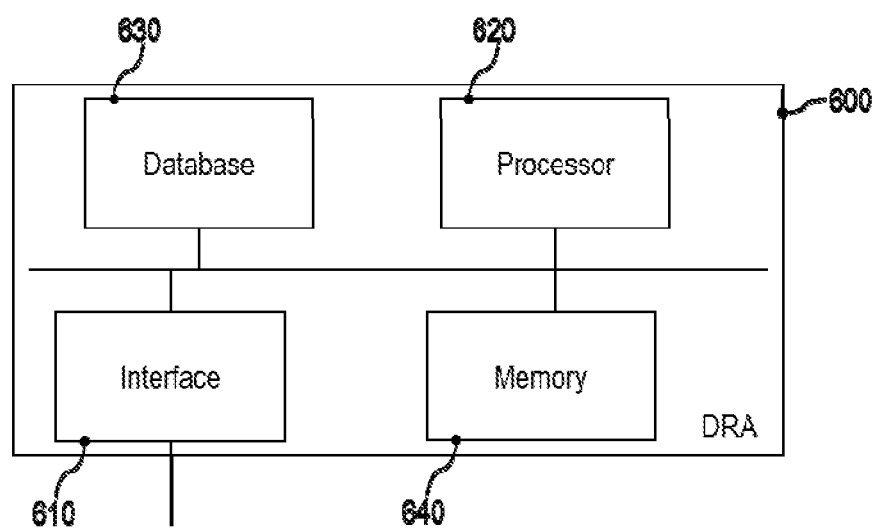
FIG. 2B schematically illustrates an embodiment of a Diameter Routing Agent (DRA) which can facilitate interaction of the RCAF and the PCRF.

In FIG. 2B, the DRA 600 is shown comprising an interface 610, a processor 620, a database 630, and a memory 640. The interface 610 can be configured to receive data and/or transmit data to/and from further entities of the mobile communications network 1. The database 630 may store entries, e.g., linking an identity of a UE with an identity of a PCRF 100. Thereby, when a message is received via the interface 610 which includes the identity of a UE, by relying on the respective entry in the database 630, the processor 620 can be configured to determine the identity of the respective PCRF 100 with which the UE is associated and, e.g., signal this identity to a further entity and/or forward the received message to the respective PCRF 100. Further, the database 630 can comprise entries linking a logical name of a given PCRF 100 with an IP address of the given PCRF 100 and/or with the DNS name of the given PCRF 100. The memory 640 may be a read-only memory, a flash read-only memory, a random access memory, a mass storage memory, a hard disk or the like. The memory 640 includes suitable program codes to be executed by the processor 620 so as to implement the above-described functionalities. The processor 620 can then generate the commands that are needed to carry out the above-discussed procedures in which the DRA 600 is involved. Such procedures include in particular: retrieving, from the database 630, an identity of a given PCRF 100 associated with the particular UE based on an identity of the UE.

In general, the DRA 600 is a node which can flexibly route individual diameter messages to the right destination. DRAs 600 are defined in the Diameter base protocol IETF RFC 3588 and 6733, section 2.8 of the IETF. The DRA 600 is helpful to route the individual diameter messages based on a number of criteria. The DRA 600 can hide the topology of the diameter routing from the end points, here the RCAF 200 and the PCRF 100. In this way, the DRA 600 allows to make management of the mobile communications network 1 easier for the operator. The DRA 600 can also support advanced functions, such a load balancing between nodes. Np-message routing via a DRA 600 is, e.g., described in 3GPP TS 23.705, version 0.11.0 of May 2014, section 6.1.5.5.2.4.

Figure 3:
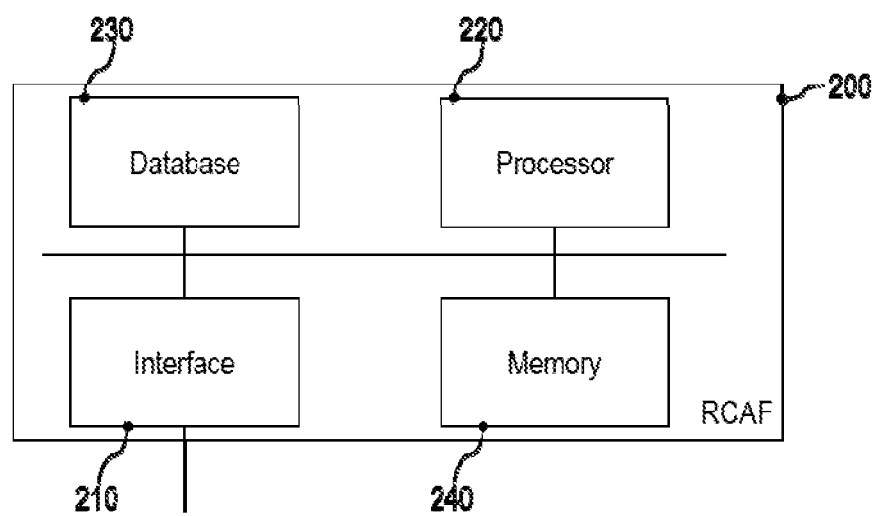
FIG. 3 schematically illustrates an embodiment of the RCAF in greater detail.

In FIG. 3, the RCAF 200 is shown in greater detail. The RCAF 200 comprises an interface 210, a processor 220, a database 230, and a memory 240. The interface 210 is configured to transmit data to various entities of the mobile communications network 1 and to receive data from the various entities of the mobile communications network. In particular, a message aggregating congestion information can be sent from the RCAF 200 employing the interface 210 via the Np interface to the PCRF 100. Further, the database 230 can be configured to include various entries linking the identity of a given UE with the identity of a PCRF 100 with which the UE is associated; such an entry may be part of a so-called UE context which may refert to data maintained on a per-UE basis. A UE context may include further information. It is then possible, prior to sending the message including the aggregated congestion information to the PCRF 100 via the interface 210, to selectively add congestion information for the given UE to the message, depending on the respective entry of the database 230.

The memory 240 can be a read-only memory, a flash read-only memory, a random access memory, a mass storage, a hard disk or the like. The memory 240 includes suitable program codes to be executed by the processor 220 so as to implement the above-described functionality. The processor 220 can then generate the commands that are needed to carry out the above-discussed procedures in which the RCAF 200 is involved. Such procedures include, in particular: aggregating the congestion information for at least some of the plurality of UEs based on the respective UEs being associated with the PCRF 100; negotiating, with the PCRF 100, a capability of the PCRF 100 to support aggregation of the congestion information; aggregating congestion information for the message.

While in FIGS. 2A, 2B, 3 a single processor 120, 220, 620 is shown, it is also possible to employ a multi-core processor and/or multiple processors suitably interacting with one another; distributed processing is possible. E.g., it may be possible to include a session identifier for any communication directed to the PCRF 100, the session identifier or load balancing identifier addressing a particular one of multiple processors 120 of the PCRF 100. Thereby, load balancing techniques may be implemented. The PCRF 100 may pre-negotiate the available session identifiers with the RCAF 200 and/or the DRA 600. In particular, the PCRF 100 may notify the RCAF 200 of a particular session identifier used for sending aggregated congestion information for one or more UEs. I.e., in general, it is possible that the RCAF 200 is configured to aggregate congestion information based on a session identifier received from the PCRF 100. Further, while in FIGS. 2A, 2B, 3, a local database 130, 230, 630 is shown, it is possible to implement the database as a functional entity logically residing, e.g., in a data backend or the like.

Figure 4:
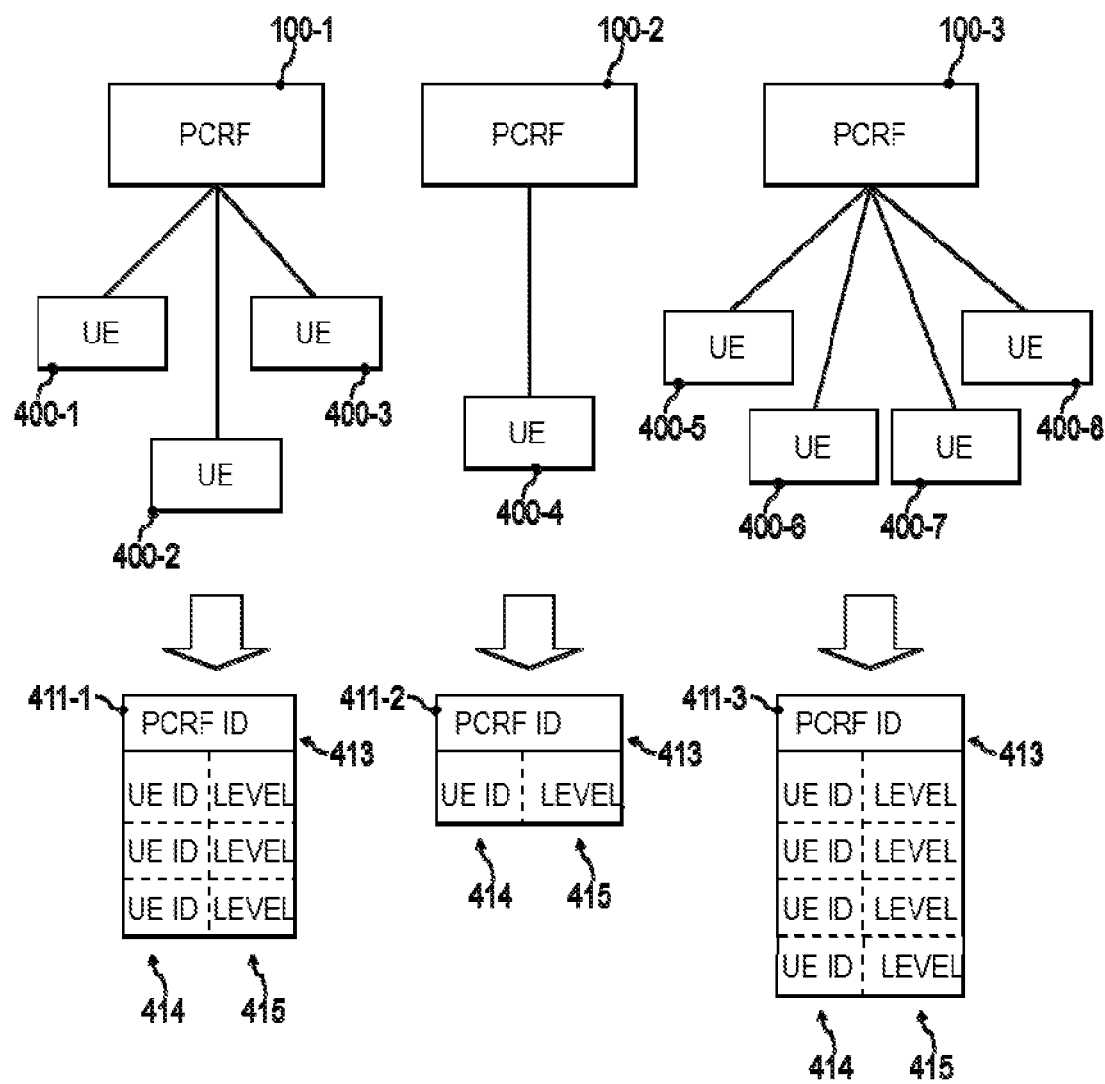
FIG. 4 illustrates an embodiment of a plurality of UEs, each UE being associated with one of a plurality of PCRFs, and further illustrates an embodiment of a message which includes congestion information for at least some of the UEs associated with a given PCRF.

In FIG. 4, the aggregation of congestion information 415 is schematically shown. In FIG. 4, a total of three PCRFs 100-1, 100-2, 100-3 are deployed throughout the mobile communications network 1. UEs 400-1, 400-2, 400-3 are associated with the first PCRF 100-1. UE 400-4 is associated with the second PCRF 100-2. UEs 400-5, 400-6, 400-7, 400-8 are associated with the third PCRF 100-3. Aggregation of congestion information for the various UEs 400-1-400-8 is illustrated by the vertical arrows in FIG. 4. For the PCRF 100-1, a first message 411-1 is generated which includes the aggregated congestion information 414 for the UEs 400-1, 400-2, 400-3. For the PCRF 100-2, a second message 411-2 is generated which includes the congestion information 450 for the UE 400-4; as the second message 411-2 only includes the congestion information 450 for the single UE 400-4, this is a non-aggregated message. For the third PCRF 400-3, a third message 411-3 is generated which includes the aggregated congestion information 415 for the UEs 400-5, 400-6, 400-7, 400-8. In the scenario of FIG. 4, the congestion information 415 is included in the messages 411-11-411-13 individually for each UE 400-1-400-8, i.e., on a per-UE basis. The congestion information 415 specifies a level of congestion for each UE 400-1-400-8. E.g., the level of congestion can relate to a numerical value indicating a severity of the congestion on a predefined scale. However, in general, it is possible that congestion information 415 relates to a binary flag indicating congestion or no congestion. In order to provide the congestion information 415 individually for each UE 400-1-400-8, the messages 411-1-411-3 further include identities 440 of the UEs 400-1-400-8 for each congestion information 415. Further, the messages 411-1-411-3 include an identity 413 of the respective PCRF 100-1-100-3 to which the message 411-1-411-3 is directed.

While in FIG. 4 a scenario is illustrated where each message 411-1-411-3 includes congestion information 415 for each one of the UEs 400-1-400-8 associated with the respective PCRF 100-1-100-3, it is also possible that the messages 411-1-411-3 include congestion information 415 only for some of the UEs 400-1-400-8 associated with the respective PCRF 100-1-100-3. In other words, it may be expendable include congestion information 415 for all UEs 400-1-400-8 being associated with a given PCRF 100-1-

100-3. E.g., the aggregation of congestion information 415 may—in addition to the identity 413 of the PCRF 100-1-100-3—further be based on a latency between receiving of a respective congestion report and/or a maximum message size of the message 411-1-411-3.

Figure 5:
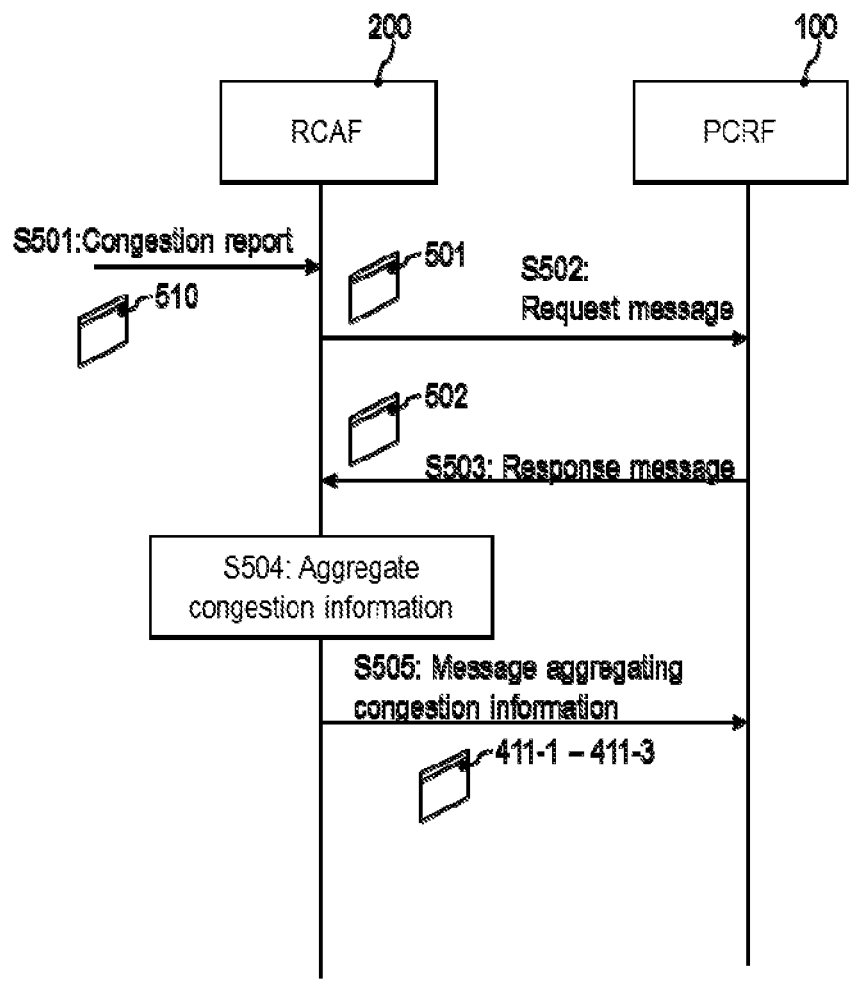
FIG. 5 is a signaling diagram illustrating an embodiment of signaling of a message including aggregated congestion information between the RCAF and the PCRF.

Turning to FIG. 5, a scenario is illustrated by means of a signaling diagram where the RCAF 200 signals congestion information 415 to the PCRF 100. In step S501, the RCAF 200 receives a congestion report 510, e.g., from the RAN OAM 11 (cf. FIG. 1). The congestion report 510 may refer to the RAN user plane congestion information (RUCI), see 3GPP TS 23.705, version 0.10.0 of May 2014. E.g., the congestion report 510 may allow to determine if a given UE 400-1-400-8 is affected by congestion of the respective RAN 10. In detail, the congestion report 510 may indicate if a eNB of the RAN 10 is affected by congestion. Based on a list of UEs 400-1-400-8 associated with the eNB, the RCAF 200 can determine that a given UE 400-1-400-8 is affected by congestion of the RAN 10. E.g., the list of UEs 400-1-400-8 associated with the eNB may be received from the MME 20 via the Nq interface—for the UMTS technology via the Nq' interface from the SGSN, respectively.

In other words, the RCAF 200 determines if the given UE 400-1-400-8 are affected by the congestion of the respective RAN 10. The retrieving of the identity of the PCRF 100 is in response to the receiving of the congestion report 510.

In a simple scenario, the RCAF 200 already has knowledge of the identity 413 of the PCRF 100 with which the given UE 400-1-400-8 is associated. E.g., such information may be provisioned in the database 230. The identity 413 of the PCRF 100 may then be readily retrieved from the database 230. In such a scenario, it is possible that the RCAF 200 aggregates the congestion information of the given UE 400-1-400-8, based on the identity 413 of the PCRF 100, in a respective message 411-1-411-3 directed to the PCRF 100.

In general, it is possible that the sending of the message 411-1-411-3 employs the retrieved identity 413 of the PCRF 100 to route the message 411-1-411-3 to the PCRF 100. The routing may occur directly, e.g., employing the DNS name and/or the IP address of the PCRF 100 as the identity 413. When employing the DNS name of the PCRF 100, it is possible to execute a DNS lookup in order to map the DNS name of the PCRF 100 to a respective IP address of the PCRF 100. The routing may also occur indirectly via the DRA 600, e.g., by employing a logical name of the PCRF 100 as the identity 413. It is also possible to employ a logical name of the PCRF 100 to route the message 411-1-411-3 directly to the PCRF 100. In such a scenario, it is possible to locally store, e.g., in database 230, a mapping table that can be used by the RCAF 200 to map the logical name to a routing address of the PCRF 100 such as the DNS name and/or the IP address. Alternatively, also in such a scenario it is possible to employ the DRA 600 to route the message to the PCRF 100.

In all such scenarios, it is possible to add a session identifier to the identity 413 of the PCRF 100 used for the messages 411-1-411-3. In other words, it is possible that the PCRF 100 sets up multiple sessions for sending the messages 411-1-411-3 from the RCAF 200 to the PCRF 100. A reason for this could be to use load-balancing techniques in the PCRF 100. It could be possible that a given PCRF 100 is structured into multiple processing units and it is more efficient for the PCRF 100 to use different session identifiers for different processing units. Based on the session identifier of an incoming message 411-1-411-3 including aggregated congestion information 415, it is possible for the PCRF 100 to direct the message 411-1-411-3 to the appropriate processing unit. Also, multiple session identifiers can help to implement parallel processing of the message 411-1-411-3 in the PCRF 100.

In the scenario of FIG. 5, it is assumed that the RCAF 200 has prior knowledge of the identity 413 of the PCRF 100 with which the given UE 400-1-400-8 is associated. Even in such a case, it may be required to negotiate aggregation capability and/or aggregation parameters with the PCRF 100. In this regard, as illustrated in FIG. 5, the RCAF 200 can be configured to send a request message 501 (step S502) including a respective flag indicating the capability of the RCAF 200 to aggregate the congestion information 415. The request message 501 can include the identity 414 of the given UE 400-1-400-8. Next, in step S503, the RCAF 200 can be configured to receive a response message 502 which includes the identity 413 of the PCRF 100 which is associated with the given UE 400-1-400-8. Further, an indication may be included that also the PCRF 100 supports the aggregation of the congestion information 415. In the scenario of FIG. 5, the RCAF 200 is configured to send the request message 501 in step S502 directly to the PCRF 100 and is further configured to receive the response message 502 in step S503 directly from the PCRF 100. This can be done, because the RCAF 200 has prior knowledge of the identity 413 of the PCRF 100. There is no need to employ the DRA 600 as a routing agent.

In a scenario where the RCAF 200 has no prior knowledge of the identity 413 of the PCRF 100, it may be required to retrieve the identity 413 of the PCRF 100 prior to sending the message 411-1-411-3 from a further entity of the mobile communications network 1. In principle, there are various scenarios conceivable to implement the retrieving of the identity 413 of the PCRF 100 from a further entity of the mobile communications network. In particular, making reference to the scenario of FIG. 6, it is possible that the RCAF 200 is configured to send the request message 501 to the DRA 600 and (step 602) and receives the response message 502 including the identity 413 of the PCRF 100 from the DRA 600 (step S603). In such a scenario, it is not required to involve the PCRF 100 in the retrieving of the identity 413 of the PCRF 100. Here, the DRA 600 works in so-called redirect mode. It would also be possible that the DRA 600 operates in so-called proxy mode. Here, the DRA 600 would forward the request message 501 or a message based upon the request message 501 to the PCRF 100. The PCRF 100 could then send the response message 502 including the identity 413 of the PCRF 100 via the DRA 600 to the RCAF 200. While, in such a scenario, one purpose of the request message 501 is to receive the response message 502 including the identity 413 of the PCRF 100, it is additionally possible to negotiate aggregation capabilities and/or aggregation parameters employing the request message 501 and/or the response message 502. In S604, the retrieved identity 413 of the PCRF 100 is stored in the database 230 of the RCAF 200. Once a further congestion report 510 for the given UE 400-1-400-8 is received by the RCAF 200 (not shown in FIG. 6), it is possible to retrieve the identity 413 of the PCRF 100 from the database 230 in a manner as explained above in view of FIG. 5; in particular, in such a case it may be not necessary to send the request message 501 and/or receive the response message 502, thereby making sending of the message 411-1-411-3 including the congestion information for the given UE 400-1-400-8 more efficient.

Figure 6:
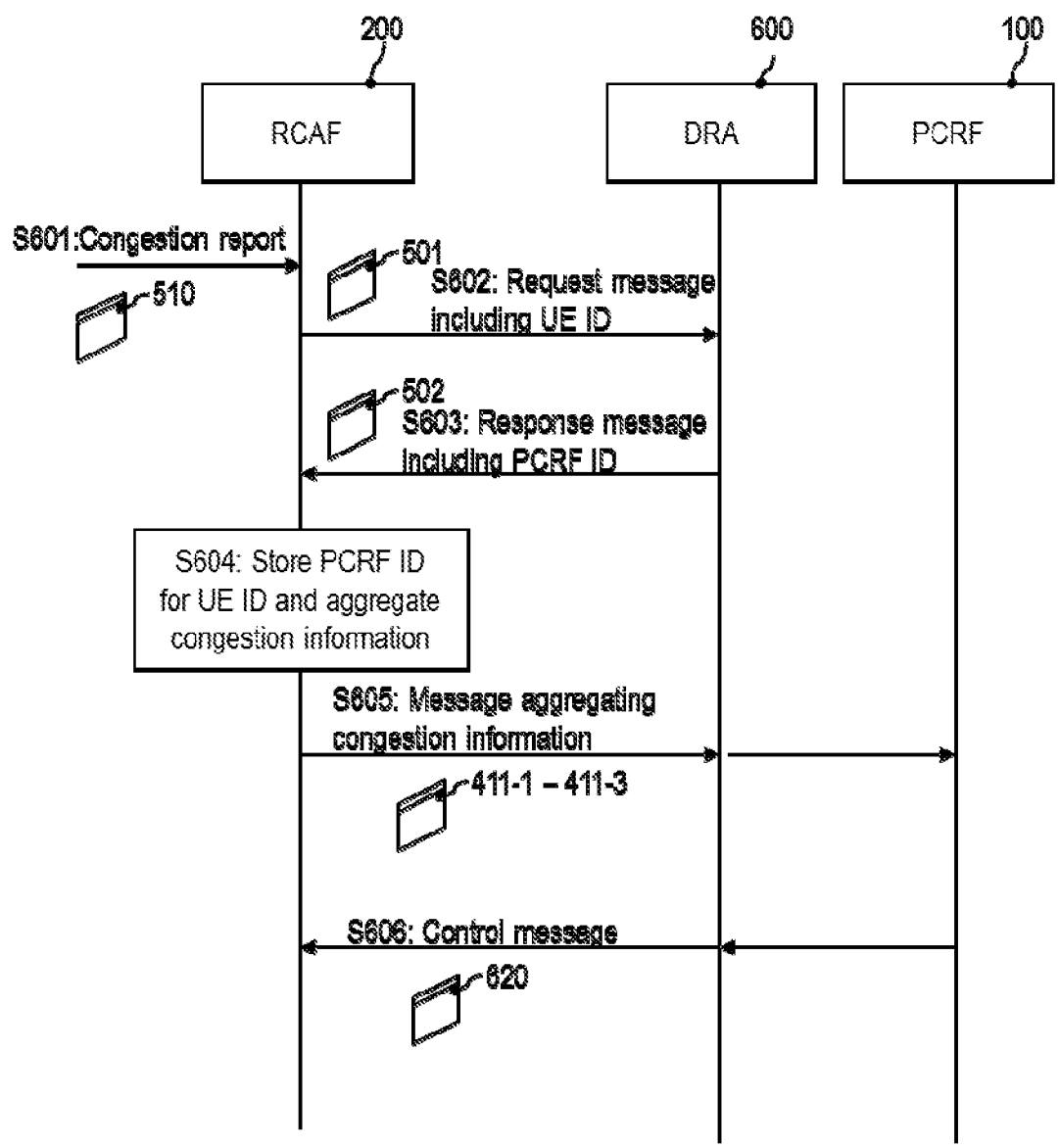
FIG. 6 is a signaling diagram illustrating an embodiment of signaling of a message including aggregated congestion information between the RCAF and the PCRF, the signaling being facilitated by the DRA.

In the scenarios of, both, FIGS. 5 and 6, in steps S504, S604, control information 415 is aggregated. In steps S505, S605, the message 411-1-411-3 is sent to the PCRF 100.

This message includes the congestion information 415 for the given UE 400-1-400-8 derived from the congestion report 510 of steps S501, S601. It aggregates further congestion information 415. As can be seen from a comparison of FIGS. 5 and 6, while in Step S505 of FIG. 5 the message 411-1-411-3 is sent directly to PCRF 100, i.e., not employing the DRA 600, it is also possible to employ the DRA 600 when sending the message 411-1-411-3 (step S605, FIG. 6). E.g., if a logical name of the PCRF 100 is retrieved as the identity 413, a locally configured mapping table provided in database 230 can be used by the RCAF 200 to map the logical name into the IP address and/or the DNS name of the PCRF 100. In such a case, direct routing of the message 411-1-411-3 to the PCRF 100 can be employed (cf. FIG. 5). Alternatively or additionally, the DRA 600 can be employed to route the message 411-1-411-3 to the PCRF 100 based on the logical name.

In FIG. 6, the optional step S606 is further illustrated. In step S606, the PCRF 100 sends the result message 620 to the RCAF 200. The result message 620 can be used to acknowledge successful receipt of the message 411-1-411-3 by the PCRF 100. The result message 620 can alternatively or additionally be employed to convey the result of processing of the message 411-1-411-3 by the processor 120 of the PCRF 100; e.g., a success of de-aggregation and/or an error code may be included. Success and/or error codes may be directed to the entire message 411-1-411-3, i.e., to all congestion information 415 included in the message 411-1-411-3; it is also possible that success or error codes address individual congestion information 415 of a given UE 400-1-400-8.

Further with reference to FIG. 6 where the scenario is shown of the DRA 600 providing the identity 413 of the PCRF 100 to the RCAF 200 is shown. Such a scenario is described in 3GPP Technical Specifications (TS) 29.213, Release 12, version 12.4.0, section 7.3.4.1. The client, here the RCAF 200, receives the identity 413 of the PCRF 100 in the redirect-host Attribute-Value-Pair (AVP) of the redirect response, as defined in 3GPP TS 29.213, section 7.3.4.1 when the DRA 600 is working in the redirect mode. The RCAF 200 receives the identity 413 of the PCRF 100 in the origin-host AVP of the diameter answer as defined in 3GPP TS 29.213, section 7.4.1.1 when the DRA 600 is working in the proxy mode. The RCAF 200 stores the identity 413 of the PCRF 100 in the database 230. It is then possible to retrieve the identity 413 from the database 230 later on and employ the identity 413 as destination-host AVP in subsequent messages 411-1-411-3. It may be possible that the subsequent messages 411-1-411-3 include aggregates congestion information to the PCRF 100, thereby bypassing the DRA 600 as defined in Diameter base protocol IETF RFC 6733 of the IETF and 3GPP TS 29.213, FIG. 7.4.1.1.1.1. Typically, the destination-host AVP includes a diameter entity that identifies the host in the form of a Full Qualified Domain Name (FQDN). If a diameter node has several FQDNs, one of them is selected.

As shown above, in general, it is possible that the request message 501 sent by RCAF 200 includes the identity 414 of the given UE 400-1-400-8; likewise it is possible that the response message 502 received by the RCAF 200 includes the identity 413 of the PCRF 100 associated with the given UE 400-1-400-8. Optionally, it is also possible that the request message 501 includes an indicator indicating a capability of the RCAF 200 to send the message 411-1-411-3 including the aggregated congestion information 415 for the plurality of UEs 400-1-400-8. Likewise, it is possible that the response message 502 includes an indicator indicating a capability of the PCRF 100 to receive the message 411-1-411-3 including the aggregated congestion information 415. By such means, it is possible to pre-negotiate a capability of both the RCAF 200 and the PCRF 100 to support aggregated congestion information 415.

While in FIGS. 5 and 6 as shown above, the request message 501 and the response message 502 are primarily employed to, firstly, retrieve the identity 413 and, secondly, negotiate aggregation capabilities and/or parameters, a further embodiment relating to the request message 501 and the response message 502 is explained below. A case is considered where the RCAF 200 has, a priori, no knowledge on the identity 413 of the PCRF 100 with which a given UE 400-1-400-8 is associated. Then, in response to receiving the congestion report 510 for the given UE 400-1-400-8, it is possible that the RCAF 200 includes the congestion information 415 in the request message 502. I.e., the request message 501 is, thirdly, employed to transmit congestion information 415 for a UE 400-1-400-8 for which no knowledge of a respective identity 413 of the associated PCRF 100 is available. E.g., the DRA 600 can route the request message 501 to the appropriate PCRF 100 based on the identity 414 of the given UE 400-1-400-8 such as the IMSI and/or APN. In general, if there are multiple PCRFs 100 associated with the given UE 400-1-400-8, it is possible to route the request message 501 to the appropriate PCRF 100 depending on the APN.

Then, as explained above, it is possible that the PCRF 100 replies by sending the response message 502 including the identity 413 of the PCRF 100. This identity 413 of the PCRF 100 may be later on employed by the RCAF 200 to, firstly, control aggregation of congestion information 415 for the given UE 400-1-400-8 and, secondly, to route the message 411-1-411-3 including the aggregated congestion information 415 to the PCRF 100. Subsequent congestion information 415 for the given UE 400-1-400-8 is then aggregated in the message 411-1-411-3. For this purpose, the RCAF 200 is configured to store the identity 413 of the PCRF 100 in the database 230. As can be seen, in the proposed scenario, the initial message, i.e., the request message 501, including the congestion information 415 for a given UE 400-1-400-8 is sent in a non-aggregated manner. I.e., the initial message, here the request message 501, does not include any congestion information 415 for UEs 400-1-400-8 other than the given UE 400-1-400-8. The request message 501 is routed by the DRA 600 to the appropriate PCRF 100, the identity 413 of which is a priori unknown to the RCAF 200. Once the PCRF 100 is found, the RCAF 200 is notified about the identity 413 of the PCRF 100 in use and the RCAF 200 stores the identity 413 in the respective context of the given UE 400-1-400-8. Subsequent messages from the RCAF 200 to the PCRF 100 including congestion information 415 for the given UE 400-1-400-8 are aggregated and preferably routed directly to the PCRF 100 using the identity 413 stored in the context of the given UE 400-1-400-8.

Figure 7:
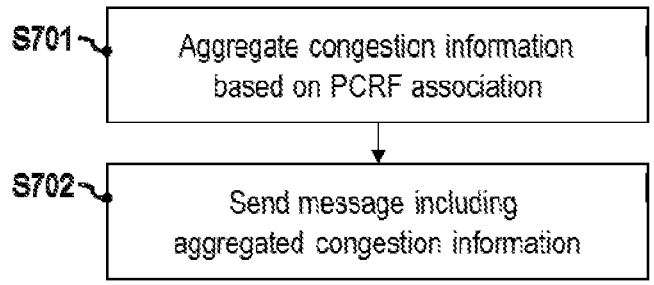
FIG. 7 is a flowchart of a method of sending a message according to various embodiments.

In FIG. 7, a flowchart of a method of sending congestion information 415 to a plurality of UEs 400-1-400-8 associated with a particular PCRF 100 is illustrated. In step S701, the congestion information 415 is aggregated for at least some of the plurality of UEs 400-1-400-8. This occurs depending on the UEs 400-1-400-8 being associated with the given PCRF 100. I.e., if it is determined that a given UE is associated (not associated) with the given PCRF 100, respective congestion information 415 for the given UE 400-1-400-8 may be included (not included) in the message 411-1-411-3. Next, in step S702, the message 411-1-411-3 including the aggregated congestion information 415 for the at least some of the plurality of UEs 400-1-400-8 is sent to the PCRF 100.

Figure 8:
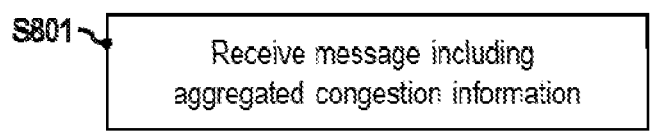
FIG. 8 is a flowchart of a method of receiving a message according to various embodiments.

In FIG. 8, a flowchart illustrates a method of receiving the message 411-1-411-3 including the aggregated congestion information 415. In step S801, the PCRF 100 is configured to receive the message 411-1-411-3. The PCRF 100 may then de-aggregate the message 411-1-411-3, thereby accessing individual congestion information 415 for the various UEs 400-1-400-8. Optionally, the PCRF 100 may send the result message 620 to the RCAF 200.

Figure 9:
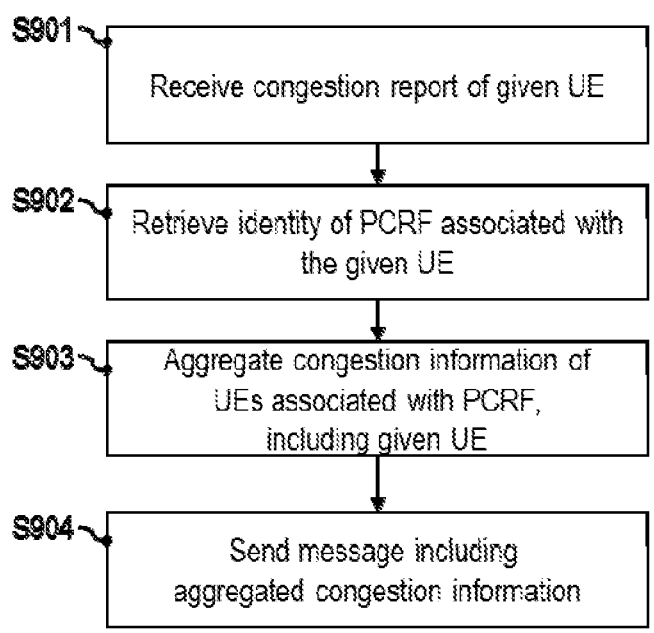
FIG. 9 is a flowchart of a method of sending the congestion information for a plurality of UEs according to various embodiments.

In FIG. 9, a flowchart of a method of sending the congestion information 415 for a plurality of UEs 400-1-400-8 according to various embodiments is shown. The method starts with step S901. First, the congestion report 510 for a given UE 400-1-400-8 is received in step S901. Next, the identity 413 of the respective PCRF 100 associated with the given UE 400-1-400-8 is retrieved in step S902. It is possible to include the congestion information 415 relating to the congestion report 510 as received in step S901 is part of a request message 501 sent during step S902 from the RCAF 200 to the PCRF 100.

Next, in step S903, congestion information 515 is aggregated for UEs 400-1-400-8 associated with the PCRF 100. This includes aggregating congestion information 415 for the given UE 400-1-400-8. Next, in step S904, the message 411-1-411-3 including the aggregated congestion information 415 of step S903 is sent from the RCAF 200 to the PCRF 100.

Figure 10:
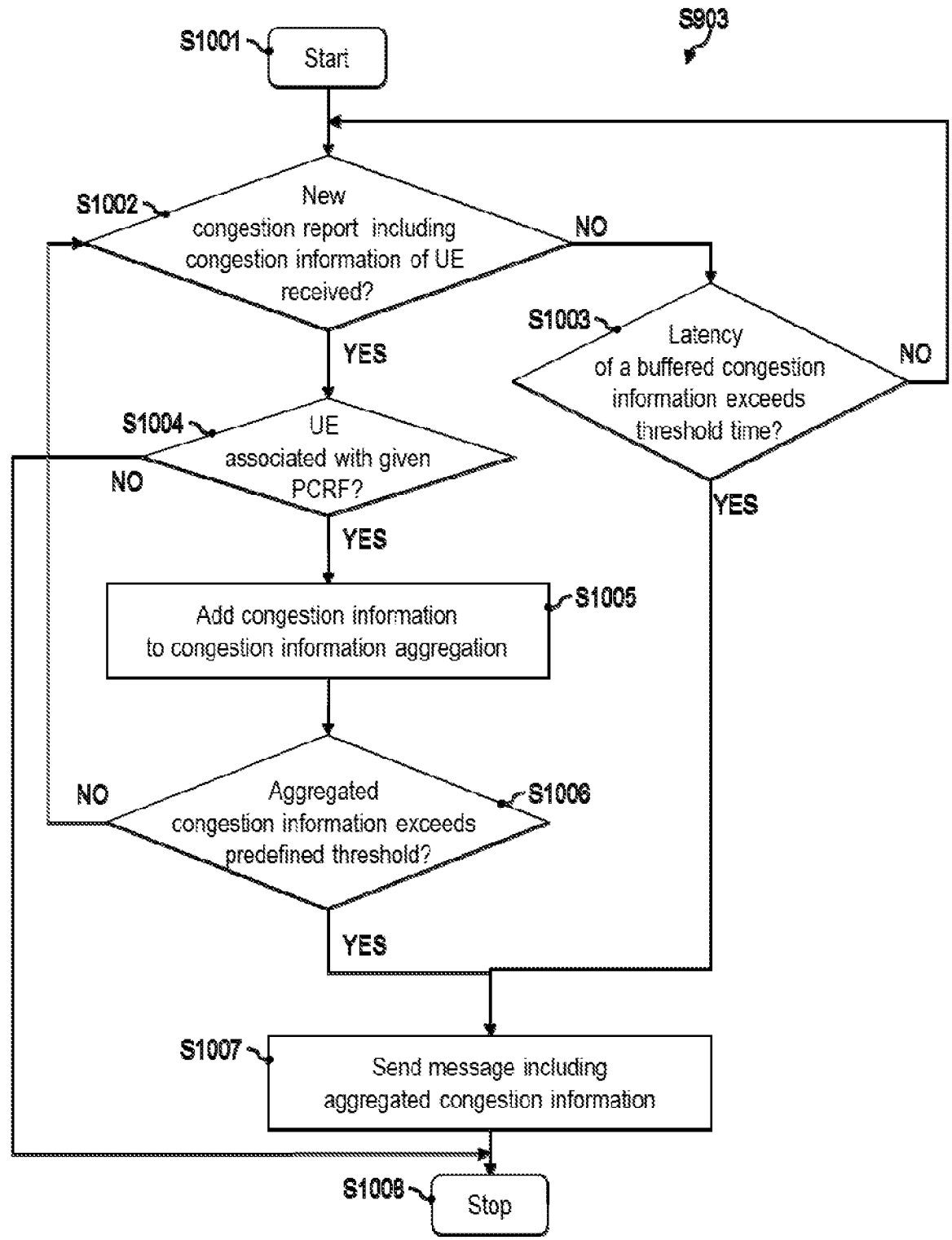
FIG. 10 is a flowchart of a method of aggregating congestion information for a PCRF according to various embodiments.

In FIG. 10, step S903, i.e., the step of aggregating congestion information 415 for a particular given PCRF 100 is shown in greater detail. In particular, as mentioned above, it is possible that the aggregating of the congestion information 415 is further based on at least one of the following: a latency between receiving of the congestion report 510 and sending of the message 411-1-411-3; and a maximum size of the message 411-1-411-3. The method starts in step S1001. Next, in step S1002, it is checked whether a new congestion report 510 is received for a given UE 400-1-400-8. The congestion report 510 allows the RCAF 200 to prepare the respective congestion information 415 for the given UE 400-1-400-8. If a respective congestion report 510 is received in step S1002, the method commences with step S1004. In step S1004, it is checked whether the given UE 400-1-400-8 for which the congestion report 510 is received is associated with the given PCRF 100. For this, the processor 220 of the RCAF 200 can be configured to access the database 230 in order to check whether in the context of the given UE 400-1-400-8 an identity 413 of the PCRF 100 associated with the UE 400-1-400-8 is provisioned. It is then checked whether this identity 413 matches the identity 413 of the given PCRF 100. If this is the case, in step S1005, the congestion information 415 is added to the buffered congestion information aggregation queue. Otherwise, the method ends with step S1008; in such a case, for further PCRFs 100 different to the given PCRF 100, the respective method may be re-executed.

In step S1006, it is checked whether the aggregated congestion information exceeds a predefined threshold. In other words, in step S1006, it is checked whether a maximum size of the message 411-1-411-3 is reached for which buffered congestion information 415 is provided. If this is the case, in step S1007, the message 411-1-411-3 is sent to the PCRF 100. If, however, the maximum size of the message 411-1-411-3 has not been reached in step S1006, the method commences with step S1002.

In step S1003, it is checked whether the latency of the buffered congestion information 415 (see step S1005) exceeds a predefined threshold time. If this is the case, then the message 411-1-411-3 is sent in step S1007. Typically, the oldest buffered congestion information 41r5 will trigger sending of the message via steps S1003, S1007. However, in principle, it is possible that different UEs 400-1-400-8 are associated with different latency times. Otherwise, the method commences with step S1002.

By implementing techniques according to FIG. 10, it is possible to implement a trade-off of between increased message size and increased latency in the sending of the congestion information 415 on the hand side; and decreased number of messages sent via the Np interface between the RCAF 200 and the PCRF 100 on the other hand side. As can be seen from the above, the RCAF 200 can use knowledge on the identity 413 of a PCRF 100 associated with a given UE 400-1-400-8 to aggregate respective congestion information 415 into a single message 411-1-411-3 (see step S1004 in step S1005 of FIG. 10). The RCAF 200 selects congestion information 415 that is destined to a given PCRF 100 based on the identity 413 of the respective PCRF 100. In general, it is not necessary, however, that all of the congestion information 415 associated with the same identity 413 of a given PCRF 100 is aggregated into a single message 411-1-411-3. One reason could be message size limitations (compare step S1006 of FIG. 10) as described above, which can lead to multiple messages.

A further reason for the RCAF 200 to send multiple messages could be to limit the delay. The OAM data, i.e., the congestion report 510, may arrive periodically to the RCAF 200 and data for certain cells or eNBs may arrive at an earlier phase than for other eNBs. Similarly, the information about a set of UEs 400-1-400-8 per cell or eNB may also arrive periodically at the RCAF 200 and come at different phases. The RCAF 200 may be configured with a maximum period of time for which aggregation of the congestion information 415 into a single message 411-1-411-3 is executed (compare step S1003 in FIG. 10). This prevents the RCAF 200 causing too much extra delay and sending the congestion information 415 for the sake of aggregation. A particular case is that the RCAF 200 aggregates congestion information 415 for a single cell or eNB only. Once the information for a single cell of eNB has been compiled into a message 411-1-411-3, that message 411-1-411-3 is sent, preventing any additional delay due to message aggregation. Generally, it is possible that aggregating of the congestion information 415 is further based on an association between the UEs 400-1-400-8 and a cell of the RAN.

As will be appreciated, above techniques have been shown which allow to aggregate congestion information 415 for various UEs 400-1-400-8 associated with a given PCRF 100. Since the UEs 400-1-400-8 typically stay attached to the mobile communications network 1 for longer periods of time and in many cases the RCAF 200 is typically to be unchanged also for longer periods of time, there can be many congestion level changes if the UE 400-400-8 stays attached to a given RCAF 200. Since this approach according to techniques as explained above can introduce signal optimization at the first or second change of the congestion level of the given UE 400-1-400-8, i.e., once the identity 413 of the associated PCRF 100 is known to the RCAF 200, the techniques allow to significantly reduce signaling load on the Np interface. At the same time, it is possible to re-use functionality of the DRA 600 for finding of the PCRF 100 associated with a given UE 400-1-400-8. The latter simplifies operation of the mobile communications network 1 and improves the deployment flexibility.

Although the invention has been shown and described with respect to certain preferred embodiments, equivalents and modifications will occur to others skilled in the art upon the reading and understanding of the specification. The present invention includes all such equivalents and modifications.

Above, primarily scenarios have been discussed where there is a given policy control unit associated with a given mobile entity. In general, it is also possible that there is a plurality of policy control units associated with a given mobile entity. In such a case, it may be possible that the congestion monitoring unit retrieves for a mobile entity multiple identities of policy control units, e.g., one per policy control unit; and employs a particular one of the multiple identities for the sending of the message including the aggregated congestion information. E.g., it may be possible that for different access points to which the mobile entity may be connected, different policy control entities are associated with the mobile entity. In such a case, it may be possible that the congestion report further includes an indication of the access point, e.g., the access point name, and that the identity of the respective associated policy control unit is retrieved based on the indication of the access point name.

E.g., it is conceivable that the congestion monitoring unit aggregates congestion information for a plurality of mobile entities into a single message. The congestion monitoring unit then can send the aggregated message to all or a group of policy control units in the mobile communications network. A particular policy control unit needs only to act on a message including congestion information for such mobile entities that are associated with the given PCRF. In such a way, it is possible to significantly reduce signalling load. The respective policy control unit needs to filter information of the received messages. In particular, in scenarios where only a few policy control units are deployed throughout the mobile communications network, this might prove a feasible option.

In a further scenario, it is possible that the congestion monitoring unit aggregates congestion information for a plurality of mobile entities into a single message. The congestion monitoring unit then sends the aggregated message to a routing database entity. The routing database entity splits up the message into multiple messages and routes the split-up messages to particular policy control units associated with congestion information of the respective mobile entities. In such a scenario, each policy control unit receives only the particular part of the aggregated message which includes congestion information for UEs associated with the respective policy control unit. In such a scenario, signalling load can be significantly reduced and functionality of a routing database entity such as a DRA can be employed in order to avoid policy control units of the mobile communications network receiving irrelevant information. In particular, for scenarios where the routing database entities possess significant computational resources, such a scenario may be feasible to implement.

We claim:

1. A method in a Radio Access Network Congestion Awareness Function (RCAF), the method comprising:
   retrieving an identity of a policy control unit of a mobile communication network, the policy control unit being associated with a plurality of mobile entities that are each connected to the mobile communication network via a corresponding radio access network, the retrieving comprising:
      sending a request message via a Diameter Routing Agent (DRA) to the policy control unit, the request message comprising:
         an identity of a given mobile entity of the plurality of mobile entities; and
         congestion information only for the given mobile entity; and
      receiving a response message including the identity of the policy control unit associated with the given mobile entity;
   aggregating congestion information indicating congestion of the radio access network of at least some of the plurality of mobile entities based on the mobile entities being associated with the identified policy control unit; and
   sending a message including the aggregated congestion information to the identified policy control unit, wherein said sending of the message employs the retrieved identity of the policy control unit to route the message.

2. The method recited in claim 1, further comprising the step of receiving a congestion report which allows determining if a given mobile entity of the plurality of mobile entities is affected by congestion of the corresponding radio access network, wherein said step of retrieving the identity of the policy control unit is in response to receiving said congestion report.

3. The method recited in claim 1, wherein the request message includes an indicator indicating a capability of the RCAF to send the message including the aggregated congestion information for at least some of the plurality of mobile entities, and wherein the response message includes an indicator indicating a capability of the policy control unit to receive the message including the aggregated congestion information for one or more of the plurality of mobile entities.

4. The method recited in claim 1, wherein the identity of the policy control unit is at least one of an Internet Protocol (IP) address or a Domain Name System (DNS) name, and wherein said step of sending the message includes routing the message directly to the policy control unit based on at least one of the IP address or the DNS name of the policy control unit.

5. The method recited in claim 1, further comprising:
   in response to said retrieving of the identity of the policy control unit, adding an entry to a database, the entry linking the identity of a given mobile entity with the identity of the policy control unit; and,
   prior to said sending of the message to the policy control unit, selectively adding congestion information for a given mobile entity of the plurality of mobile entities to the message depending on the respective entry of the database.

6. The method recited in claim 1, wherein said aggregating of the congestion information is further based on at least one of the following: a latency between receiving of a congestion report and sending of the message; a maximum size of the message; and a session identifier associated with a given mobile entity and previously received from the policy control unit, the session identifier identifying processing resources of the respective policy control entity.

7. The method recited in claim 6, further comprising the step of negotiating, prior to said step of aggregating, the maximum size of the message with the policy control unit.

8. A Radio Access Network Congestion Awareness Function (RCAF) comprising:
at least one processor and at least one memory, said memory containing instructions which, when executed by said processor, are operative to cause said RCAF to:
retrieve an identity of a policy control unit of a mobile communication network, the policy control unit being associated with a plurality of mobile entities that are each connected to the mobile communication network via a corresponding radio access network, wherein to retrieve the identity, the RCAF is configured to:
send a request message via a Diameter Routing Agent (DRA) to the policy control unit, the request message comprising:
an identity of a given mobile entity of the plurality of mobile entities; and
congestion information only for the given mobile entity; and
receive a response message including the identity of the policy control unit associated with the given mobile entity;
aggregate congestion information indicating congestion of the radio access network of at least some of the plurality of mobile entities based on the mobile entities being associated with the identified policy control unit; and
send a message including the aggregated congestion information to the policy control unit, wherein the message employs the retrieved identity of the policy control unit to route the message.

9. The RCAF recited in claim 8, wherein the RCAF is further operative to receive a congestion report which allows determining if a given mobile entity of the plurality of mobile entities is affected by congestion of the corresponding radio access network, and wherein retrieving the identity of the policy control unit is in response to said receiving of the congestion report.

10. The RCAF recited in claim 8, wherein the request message includes an indicator indicating a capability of the RCAF to send the message including the aggregated congestion information for at least some of the plurality of mobile entities, and wherein the response message includes an indicator indicating a capability of the policy control unit to receive the message including the aggregated congestion information for one or more of the plurality of mobile entities.

11. The RCAF recited in claim 8, wherein the identity of the policy control unit is at least one of an Internet Protocol (IP) address or a Domain Name System (DNS) name, and wherein the message is directly routed to the policy control unit based on at least one of the IP address or the DNS name of the policy control unit.

12. The RCAF recited in claim 8, wherein, in response to retrieving the identity of the policy control unit, the RCAF is further operative to add an entry to a database, the entry linking the identity of a given mobile entity with the identity of the policy control unit; and, wherein, prior to said sending of the message to the policy control unit, the RCAF is further operative to selectively add congestion information for a given mobile entity to the message depending on the respective entry of the database.

13. The RCAF recited in claim 8, wherein the RCAF is further operative to aggregate the congestion information for the message depending on at least one of the following: a latency between receiving of a congestion report and sending of the message; a maximum size of the message; and a session identifier associated with a given mobile entity and previously received from the policy control unit, the session identifier identifying processing resources of the respective policy control entity.

14. The RCAF recited in claim 13, wherein, prior to said aggregating, the RCAF is operative to negotiate the maximum size of the message with the policy control unit.

15. A method in a policy control unit, the method comprising: receiving a request message via a Diameter Routing Agent (DRA) from a Radio Access Network Congestion Awareness Function (RCAF) of a mobile communication network to which each of a plurality of mobile entities is connected via a corresponding radio access network, wherein each of the mobile entities is associated with a corresponding policy control unit and the request message is a request to transmit, to the policy control unit, aggregated congestion information of the radio access network corresponding to a given mobile entity, wherein the request message comprises:
an identity of the given mobile entity; and
congestion information only for the given mobile entity;
in response to receiving the request message, sending a response message including an identity of the policy control unit to the RCAF; and
receiving, from the RCAF, a message including the aggregated congestion information for a plurality of mobile entities associated with the policy control unit.

16. The method recited in claim 15, wherein the request message includes an indicator indicating a capability of the RCAF to send the message including the aggregated congestion information for the plurality of mobile entities; and, wherein the response message includes an indicator indicating a capability of the policy control unit to receive the message including the aggregated congestion information.

17. A policy control unit comprising:
at least one processor and at least one memory, said memory containing instructions which, when executed by said processor, are operative to cause said policy control unit to:
receive a request message via a Diameter Routing Agent (DRA) from a Radio Access Network Congestion Awareness Function (RCAF) of a mobile communication network to which each of a plurality of mobile entities is connected via a corresponding radio access network, wherein each of the mobile entities is associated with a corresponding policy control unit and the request message is a request to transmit, to the policy control unit, aggregated congestion information of the radio access network corresponding to a given mobile entity,
wherein the request message comprises:
an identity of the given mobile entity; and
congestion information only for the given mobile entity; and
in response to receiving the request message, send a response message including an identity of the policy control unit; and
receive, from the RCAF, a message including the aggregated congestion information for a plurality of mobile entities associated with the policy control unit.

18. The policy control unit recited in claim 17, wherein the request message includes an indicator indicating a capability of the RCAF to send the message including the aggregated congestion information for the plurality of mobile entities; and, wherein the response message includes an indicator indicating a capability of the policy control unit to receive the message including the aggregated congestion information.

\* \* \* \* \*